H. MOCK.
COFFEE MAKING DEVICE.
APPLICATION FILED JAN. 6, 1922.

1,428,046.

Patented Sept. 5, 1922.

Hugo Mock INVENTOR

Patented Sept. 5, 1922.

1,428,046

UNITED STATES PATENT OFFICE.

HUGO MOCK, OF NEW YORK, N. Y.

COFFEE-MAKING DEVICE.

Application filed January 6, 1922. Serial No. 527,479.

*To all whom it may concern:*

Be it known that I, HUGO MOCK, a citizen of the United States, residing at 930 St. Nicholas Ave., New York, in the county of New York and State of New York, have invented certain new and useful Improvement in Coffee-Making Devices, of which the following is a specification.

This invention has for its object the provision of a simple means and method of preparing coffee as a beverage.

A further object of the invention is the provision of means for securing the maximum extraction of the potable ingredients of coffee with a minimum amount of tannin and undesirable ingredients.

A further object of the invention is the provision of means for using pulverized coffee in preparing the coffee beverage, including means for readily separating the pulverized coffee from the potable beverage.

Figure 2:
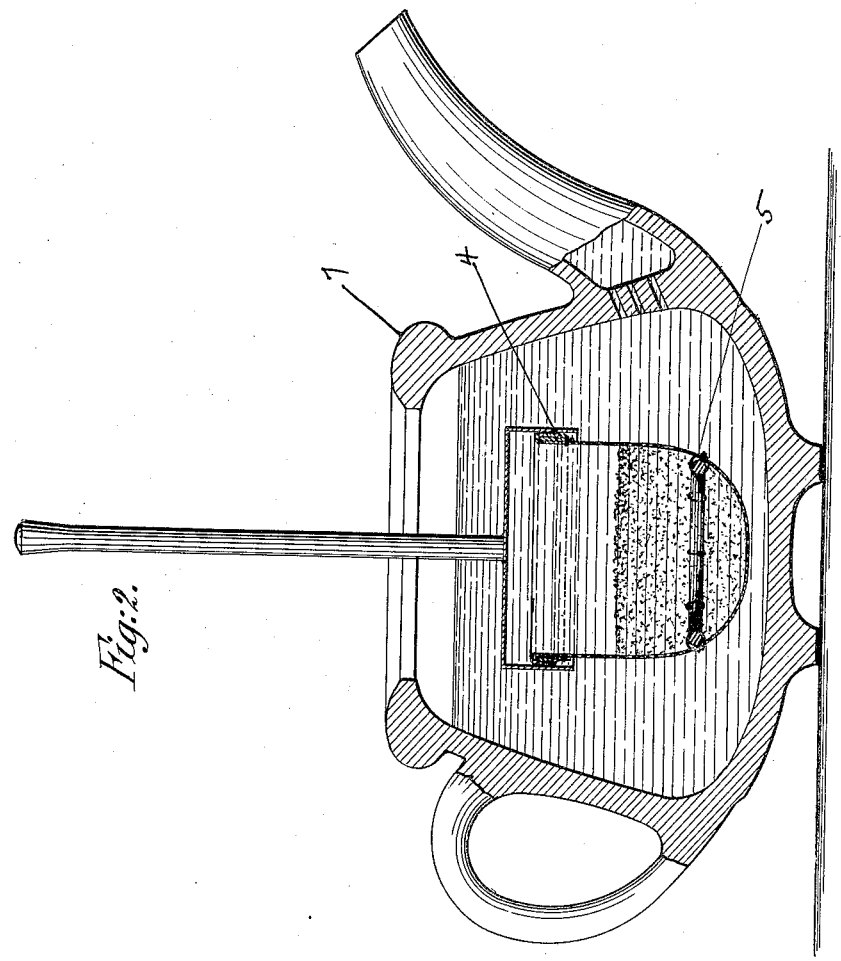
Figure 1:
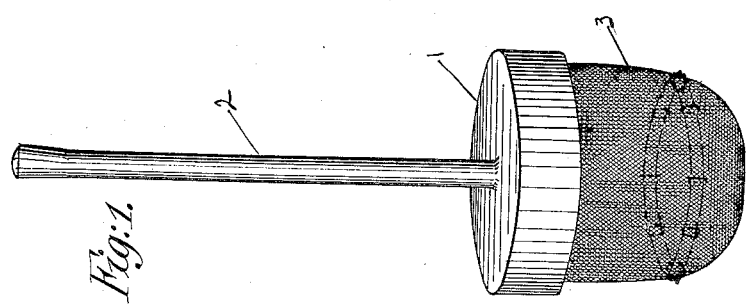

Further objects of the invention will be apparent from the drawings, in which Figure 1 is a perspective view of the device. Figure 2 is a sectional view of the device shown in use.

1 is a shallow metallic member having a handle 2 fixed thereto, the hollow member 1 and handle 2 being preferably made of aluminum. 3 is a bag of textile fabric such as canton or cotton flannel of sufficient density to permit the passage of coffee extract but not permitting the passage of pulverized or finely ground coffee. As shown in Figure 2, the bag 3 has a large opening at the top thereof, the edges of the bag being drawn over a metallic aluminum ring 4 so that the top of the bag retains its shape. The member 1 is adapted to fit the ring 4 and the edge of the bag 3 so that when the ring 4 is adjusted inside of the member 1, the bag 3 is tightly closed, and while permitting the passage of fluid through the fabric of the bag 3 none of the coffee contained in the bag can escape therefrom. 5 represents a ring made of metal or glass which is attached to the lower part of the bag 3 in order to properly weight same and the function of which will be hereafter explained. 7 represents a tea or coffee pot or any conventional device which will hold boiling water and forms no subject of this invention.

The operation of the device is as follows:—

The bag 3 is half filled with extremely finely ground or pulverized coffee and the top member 1 is inserted over the ring 4 and the entire device is inserted into the vessel 7. Boiling water is then poured into the vessel 7 to completely cover the member 1. The boiling water enters the bag 3 and is disseminated therethrough. By moving the handle 2 up and down, a piston-like action is produced and the liquid contents of the bag are being constantly changed so that thorough infusion of the coffee in the bag 3 is possible. The heavy ring 5 which is sewn into the bag 3 is for the purpose of automatically expanding the bag 3 when it has been contracted by the action of the handle 2. After the handle 2 has been pushed down, the bag 3 is naturally collapsed, but on lifting up the handle 2, it will naturally expand again through the weight of the heavy ring 5. When the maximum amount of extraction has taken place, the device is removed entirely from the container 7 and the coffee is ready for drinking.

In operation, it is preferable that the container 7 should first be heated with boiling water so that it will be as near as possible to a temperature of 212 and care should be taken that the water used in the extraction should also be vigorously boiling.

By the device above described, the grounds are easily removed from the liquid beverage and by means of the intermittent compression and agitation produced with the handle 2 and the construction shown, a full extraction is obtained.

I am aware that it is old in the art to use coffee bags and filters, but I believe it is novel to make a coffee bag of the particular form and construction herein described.

What I claim is:—

1. In a coffee making device, a bag of textile fabric, the texture of said bag permitting the ready passage of coffee extract therethrough but not permitting the passage of pulverized coffee, a rigid closure for the top of said bag and a handle attached to said closure and means attached to said bag for expanding the same.

2. In a coffee making device, a bag of textile fabric having an opening at the top thereof, a metallic closure for said opening and a handle attached to said closure by which the contents of said bag may be simultaneously agitated and compressed, so that the coffee beverage is forced through the bag, and means for facilitating expanding said bag.

3. In a coffee making device, a bag of textile fabric, a flat metallic plate closing said bag, a handle attached to said plate, said bag being so weighted as to expand after compression.

4. In a coffee making device, a closed porous bag permitting the ready passage of coffee extract therethrough but not permitting the passage of pulverized coffee, and means extraneous of the weigth of the bag for compressing and agitating and expanding said bag.

5. In a coffee making device, a bag of textile fabric, means for closing said bag and means for compressing and agitating the bag and means permanent within the bag for expanding said bag, so that the coffee extract is intermittently ejected from and injected into said bag.

6. In a coffee making device, a bag of textile fabric, a flat metallic plate closing said bag, a handle attached to said plate by which the contents of said bag may be compressed, and means normally weighting the bag at the bottom and serving to hold it normally elongated and for expanding said bag after compression.

In testimony whereof I hereunto affix my signature.

HUGO MOCK.